(12) United States Patent
Hara et al.

(10) Patent No.: US 7,742,143 B2
(45) Date of Patent: Jun. 22, 2010

(54) LARGE-SIZED DISPLAY APPARATUS AND DISPLAY DEVICE AND DISPLAY MODULE USED IN LARGE-SIZED DISPLAY APPARATUS

(75) Inventors: Zenichiro Hara, Tokyo (JP); Noritaka Egami, Tokyo (JP); Masaaki Hiraki, Tokyo (JP); Yuusaku Saitou, Tokyo (JP); Takeshi Itadani, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 309 days.

(21) Appl. No.: 11/508,912

(22) Filed: Aug. 24, 2006

(65) Prior Publication Data
US 2007/0206148 A1    Sep. 6, 2007

(30) Foreign Application Priority Data
Mar. 2, 2006    (JP)    ............................. 2006-056384

(51) Int. Cl.
*G02F 1/1339*    (2006.01)
*G09G 5/00*    (2006.01)
(52) U.S. Cl. .................. 349/153; 349/156; 349/160; 345/4; 345/5
(58) Field of Classification Search ................ 349/153, 349/156, 160, 56, 58, 115, 149, 73, 74; 345/4, 345/5, 6, 1
See application file for complete search history.

(56) References Cited

U.S. PATENT DOCUMENTS

| 6,400,428 | B1 | 6/2002 | Izumi | .......................... 349/73 |
| 6,498,592 | B1* | 12/2002 | Matthies | ..................... 345/1.1 |
| 6,831,712 | B1* | 12/2004 | Stephenson et al. | ........... 349/86 |
| 7,382,422 | B2* | 6/2008 | Niiyama et al. | ............... 349/58 |
| 2002/0080303 | A1 | 6/2002 | Izumi | .......................... 349/73 |
| 2005/0001954 | A1* | 1/2005 | Stephenson et al. | ........... 349/86 |
| 2005/0083465 | A1* | 4/2005 | Niiyama et al. | ............. 349/122 |
| 2007/0206148 | A1* | 9/2007 | Hara et al. | ................... 349/153 |

FOREIGN PATENT DOCUMENTS

| JP | 7-20443 A | 1/1995 | ............... 349/73 X |
| JP | 10-254380 A | 9/1998 | ............... 349/73 X |
| JP | 2004-341468 A | 12/2004 | ............... 349/73 X |

* cited by examiner

*Primary Examiner*—Brian M Healy
(74) *Attorney, Agent, or Firm*—Buchanan Ingersoll & Rooney PC

(57) ABSTRACT

A protective measure against rainfalls or ultraviolet rays is applied to planar display devices which comprise a large-sized display apparatus thus allowing display modules which include display devices to be used outdoors and, at the same time, the structure of a frame is simplified thus realizing the reduction of weight, thickness and a manufacturing cost of the large-sized display apparatus. In a large-sized display apparatus arranging a plurality of planar display devices, as the planar display device, a display device which comprises a display device body which includes a display region in the inside thereof and has a peripheral portion of the display region sealed, and a protective glass which is fixedly mounted on a front surface of the display device body using an adhesive material is used.

15 Claims, 9 Drawing Sheets

REFLECTION OF
EXTERNAL LIGHT

LARGE-SIZED DISPLAY APPARATUS AND DISPLAY DEVICE AND DISPLAY MODULE USED IN LARGE-SIZED DISPLAY APPARATUS

BACKGROUND OF THE INVENTION

1. Field of the Invention

The present invention relates to a large-sized display apparatus arranging planar display devices, and more particularly to a large-sized display apparatus for use outdoors.

2. Description of the Related Art

Heretofore, with respect to this type of large-sized display apparatus, originally, a method which arranges monochroic CRTs (cathode ray tubes) as display devices has been put into practice. Thereafter, a display device which includes a plurality of pixels in the inside of the display device by applying a principle of a CRT or a discharge tube has been developed and the resolution has been remarkably improved. Thereafter, a method which arranges liquid crystal display devices as described in following patent documents 1, 2 has been put into practice. Then, a method which arranges plasma display panels or vacuum fluorescent display has been proposed on a trial basis. In this manner, various types of display devices can be used for constituting the large-sized display apparatus. Recently, the method which comprises the large-sized display apparatus arranging LEDs (light emitting diodes) has become a mainstream. In this manner, the large-sized display apparatus is now applicable to various applications such as in-door high-resolution application, outdoor ultra-high-luminance application, light-weighted and thin building-wall-surface application.

[Patent document 1] JP-A-2002-72928

[Patent document 2] JP-A-2004-341468

This type of conventional large-sized display apparatus, when used outdoors in a state that a plurality of planar display devices are arranged, as in the case of display modules including display devices, is configured such that a sufficient waterproof measure is applied to electronic equipment inside a frame which supports the apparatus as a whole thus enabling the installation of the large-sized display apparatus in an arbitrary environment. Here, there may be a case in which a front glass for protecting a plurality of display modules as a whole from rainfalls is arranged in front of the apparatus. In such a case, the frame itself has to possess a sufficient strength and reliability. Accordingly, there has been a drawback that a manufacturing cost of the large-sized display apparatus becomes large as a whole and weight of the large-sized display apparatus increases corresponding to a size of the front glass.

SUMMARY OF THE INVENTION

The present invention has been made under such circumstances and it is an object of the present invention to apply a protective measure to cope with rainfalls or ultraviolet rays to planar display devices which comprise a large-sized display apparatus thus allowing display modules which include the display devices to be used outside and, at the same time, and to simplify the structure of a frame thus enabling the reduction of weight, thickness and manufacturing cost of the large-sized display apparatus.

An aspect of the present invention is a large-sized display apparatus comprising a plurality of planar display devices arranged to compose a large-sized display, wherein the planar display device includes a display device body having a display region, whose outer peripheral region is sealed, inside and a protective glass ahead to the front of the display device body by adhesive material.

According to the present invention, in the large-sized display apparatus comprising a plurality of planar display devices arranged to compose a large-sized display, the protective glass is adhered to each display device body and a waterproof means or a means which blocks ultraviolet rays is provided along with the adhesion thus ensuring the reliability of the display module which includes the display device for outdoor use whereby it is possible to realize the reduction of weight, thickness and a manufacturing cost of the frame which supports the apparatus as a whole.

BRIEF DESCRIPTION OF THE DRAWINGS

The present invention will become more fully understood from the detailed given hereinbelow and the accompanying drawings which are given by way of illustration only, and thus are not limitative of the present invention and wherein.

DESCRIPTION OF THE PREFERRED EMBODIMENTS

Embodiments of the present invention are explained hereinafter in conjunction with attached drawings.

Embodiment 1

Hereinafter, an embodiment 1 of the present invention is explained in conjunction with FIG. 1 to FIG. 8.

Figure 1:
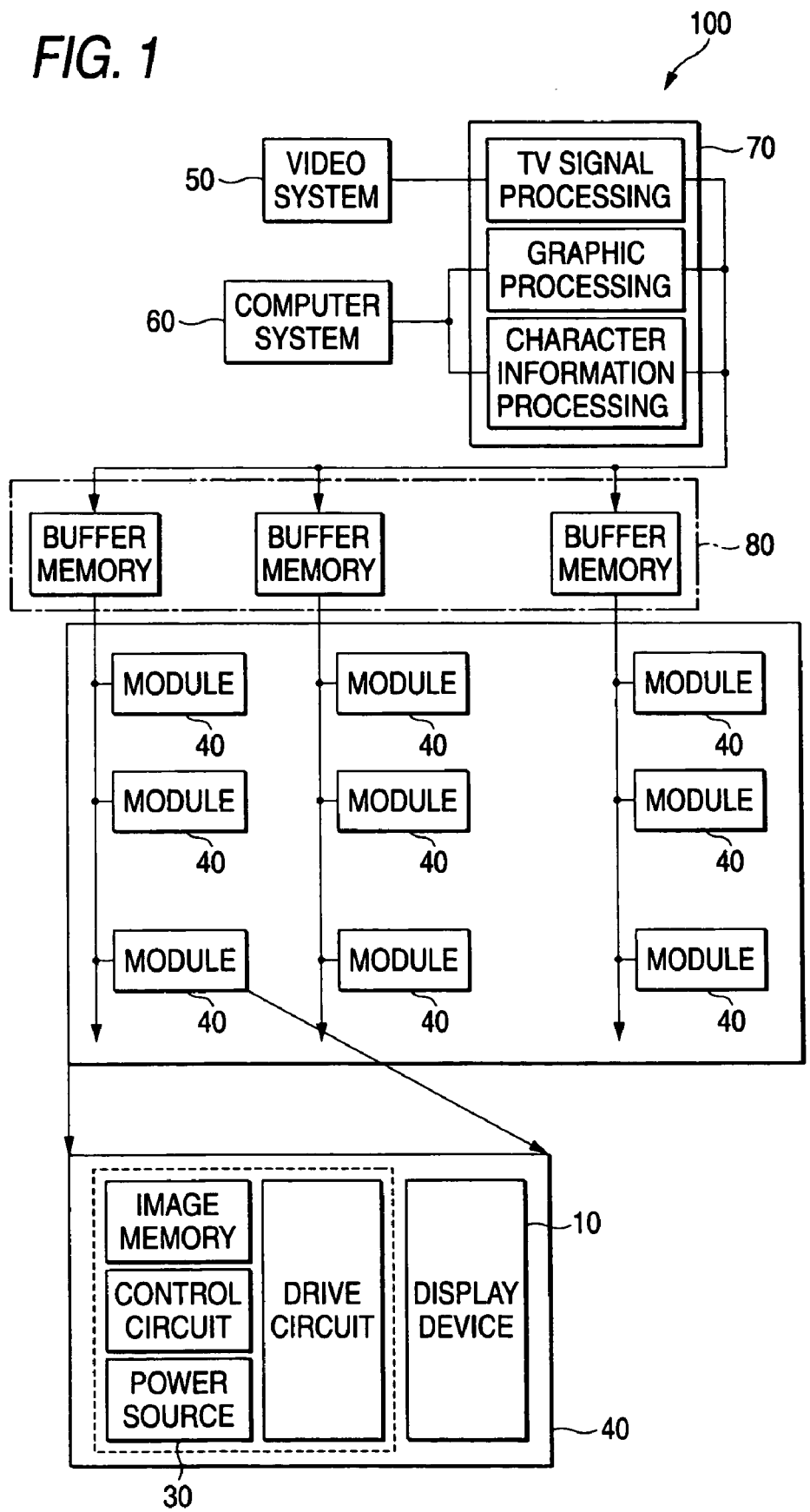
FIG. 1 is a block diagram showing the structure of a large-sized display apparatus of an embodiment 1 of the present invention.

FIG. 1 is a block diagram showing the typical structure of a large-sized display apparatus of the embodiment 1 of the present invention. The large-sized display apparatus 100 is formed by arranging display modules 40 each of which mounts a control printed circuit board 30 on each display device 10 in a matrix array. Signals to be displayed are supplied from a video system 50 or a computer system 60 and are synthesized by a display controller 70. Further, the synthesized signals are transferred to respective display modules 40 via a buffer memory 80. The display module 40 includes a power source when necessary. To make tile-shaped seams formed among the display devices 10 inconspicuous, the respective display modules 40 are arranged close to each other. On each display module 40, a portion of an image which is divided corresponding to a size of the display module is displayed and one image is displayed over the whole screen.

Figure 2:
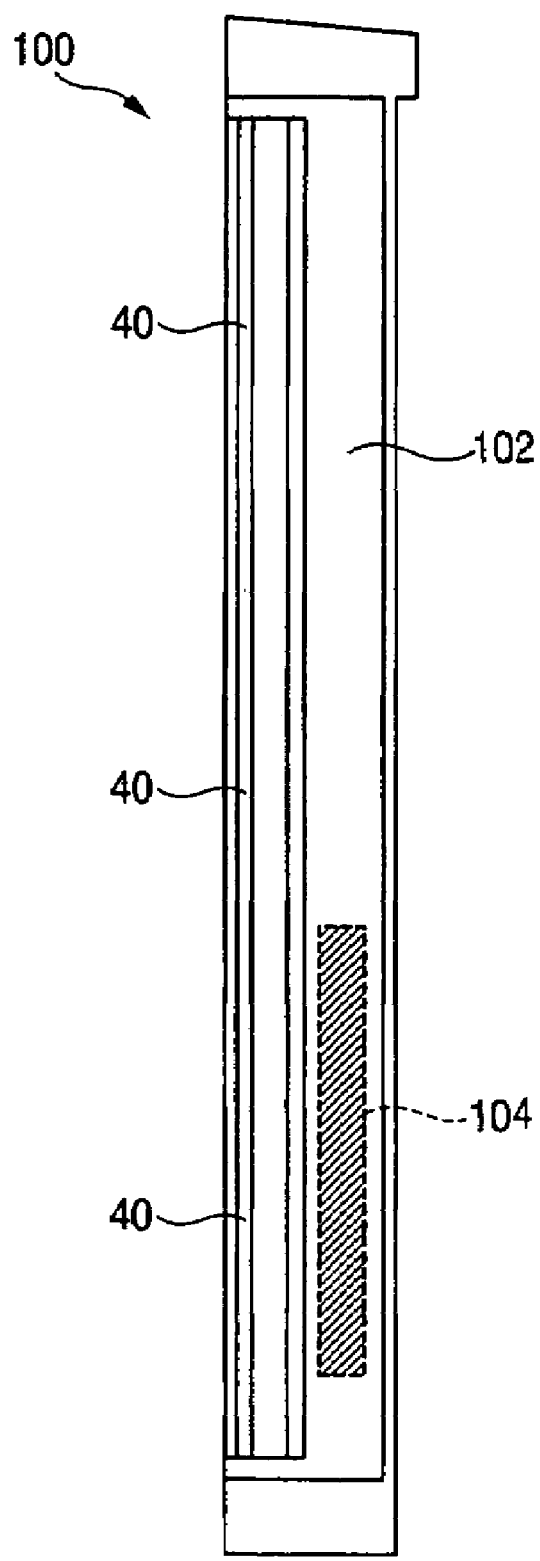
FIG. 2 is a schematic cross-sectional view showing the large-sized display apparatus of an embodiment 1 of the present invention.

FIG. 2 is a schematic cross-sectional view showing the large-sized display apparatus 100 of the embodiment 1 of the present invention. In the inside of a frame 101 which supports the apparatus as a whole, support columns 102 are regularly arranged. On these support columns 102, the display modules 40 including the display devices 10 to which protective glasses are adhered as described later are mounted and, at the same time, electronic equipment 104 for these display modules 40 are accommodated in the inside of the frame 101.

Figure 3:
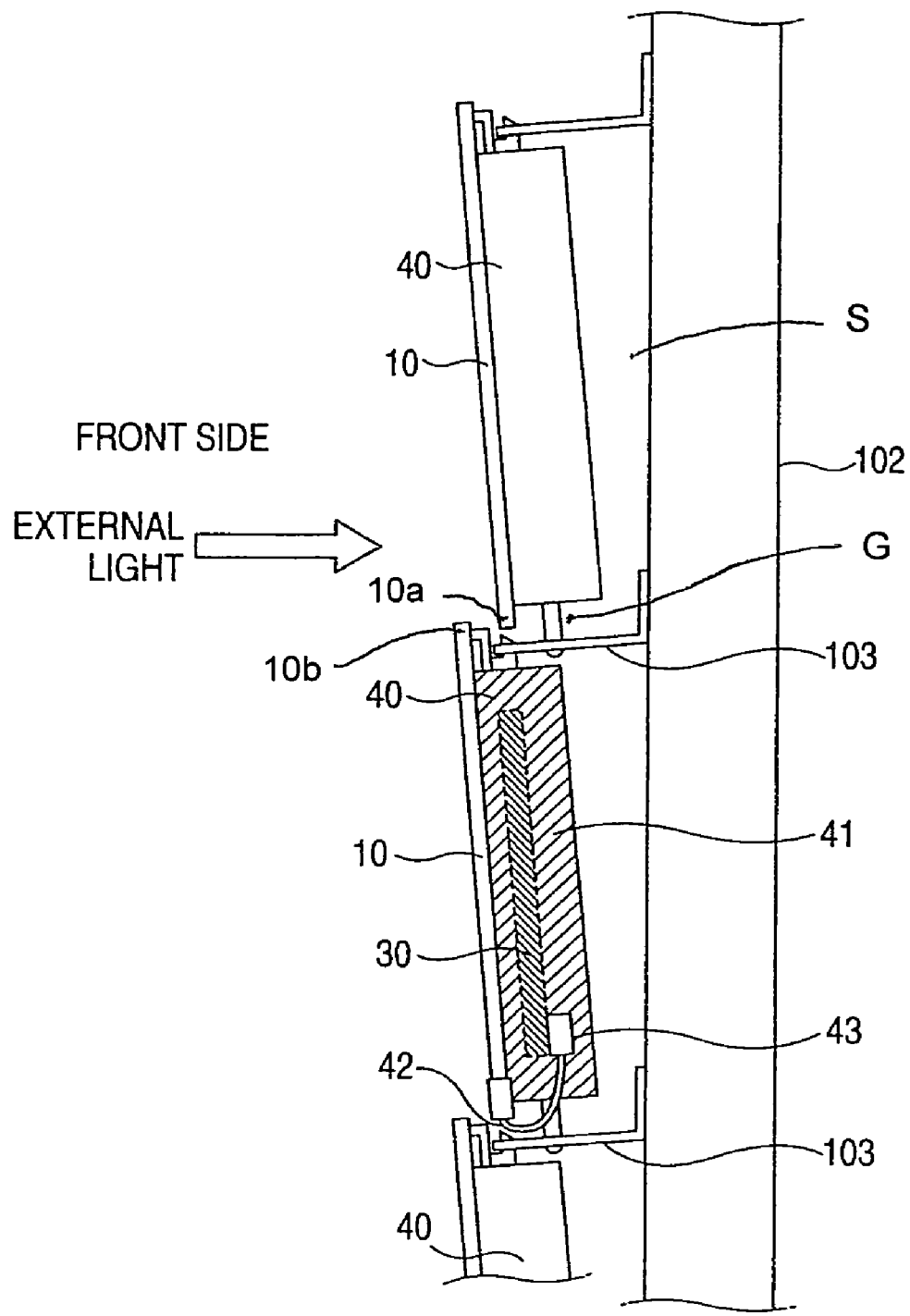
FIG. 3 is a side view showing a support state of display devices in the large-sized display apparatus of an embodiment 1 of the present invention.

FIG. 3 is a view showing a support state of planar display devices 10 in the large-sized display apparatus which uses such planar display devices 10. On a holder 103 which is formed on the support column or frame 102, the display module 40 which includes the display device 10 to which a protective glass described later is adhered is mounted. Each display module 40 is arranged in an inclined, generally parallel manner, wherein to a lower edge portion 10a of the display device 10 of the module, an upper edge portion 10b of the display device 10 of the neighboring module is superposed thus covering an electrode whereby the seam is made inconspicuous. An air space S is formed between the frame 102 and the modules 40. An air gap G, formed between the modules 40, communicates with the air space S.

The display module 40 comprises structural parts such as the display device 10, a casing 41 which stores the printed circuit board 30 and the like. A circuit for driving and controlling the display device 10 is mounted on the printed circuit board 30.

Figure 4:
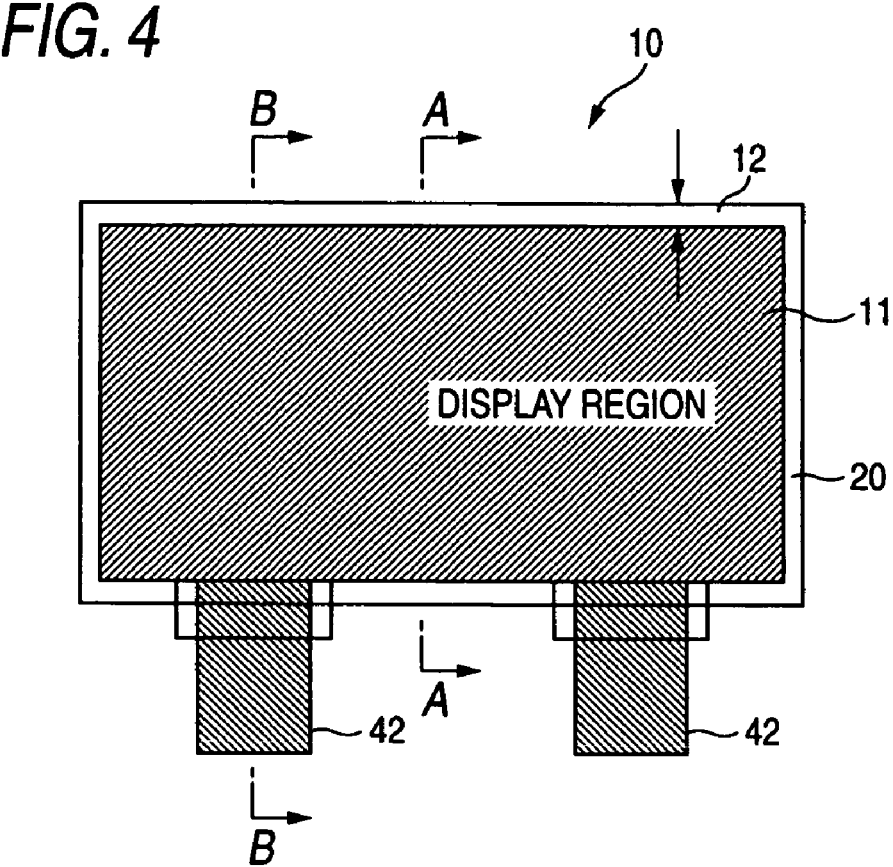
FIG. 4 is a schematic plan view showing the display device of the embodiment 1 of the present invention.
Figure 5:
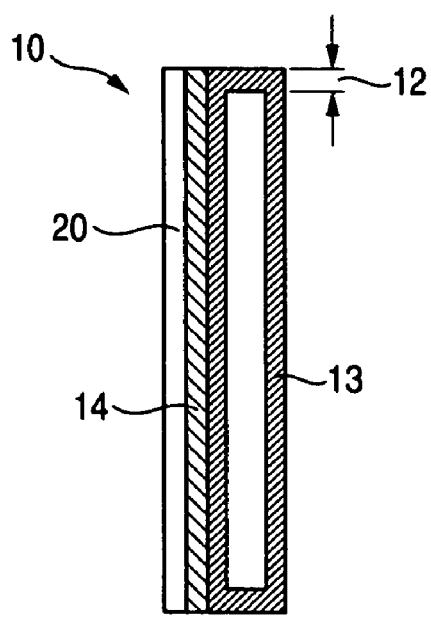
FIG. 5 is a cross-sectional view taken along a line A-A in FIG. 4.
Figure 6:
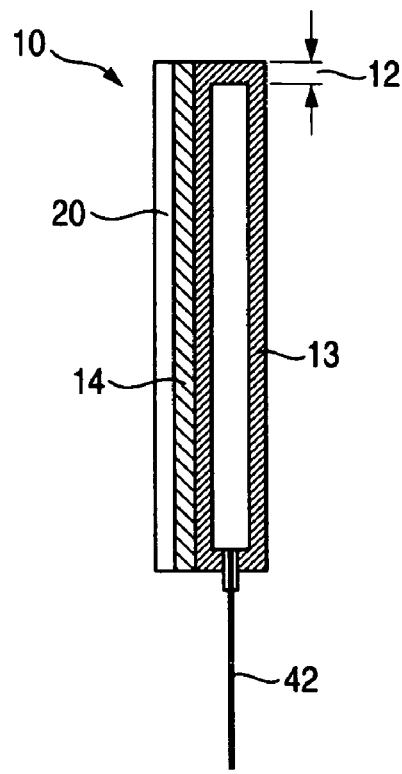
FIG. 6 is a cross-sectional view taken along a line B-B in FIG. 4.

FIG. 4 is a schematic plan view showing the structure of the display device of the embodiment 1 of the present invention, FIG. 5 is a cross-sectional view taken along a line A-A in FIG. 4, and FIG. 6 is a cross-sectional view taken along a line B-B in FIG. 4.

The display device 10 includes a display device body 13 which has a display region 11 made of liquid crystal or the like therein and has a peripheral portion thereof sealed with a sealing material which wraps the display region 11 with a predetermined sealing width 12, and a protective glass 20 which is adhered to a front surface of the display device body 13 using an adhesive material 14. Electrodes of the display device 10 are pulled out using a flexible wire 42 as shown in FIG. 3 and are connected to the printed circuit board 30 through a connector 43.

Figure 7:
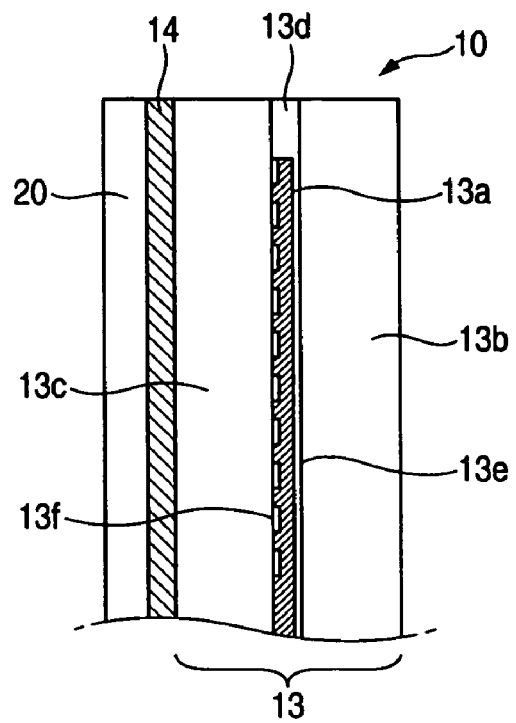
FIG. 7 is a partial cross-sectional view showing one example of the display device used in the embodiment 1 of the present invention.

FIG. 7 shows the structure of a liquid crystal display device as one example of the display device 10, wherein the display device body 13 is formed by sandwiching a liquid crystal display layer 13a with two glass panels 13b, 13c and by joining both glass panels using a sealing material 13d. The protective glass 20 is adhered to a front surface of a display-side glass panel 13c of the display device body 13 using the adhesive material 14. As the adhesive material 14, an ultra-violet-ray-curing-type transparent adhesive material is used and is applied to the whole surface of the display-side glass panel 13c.

Figure 8:
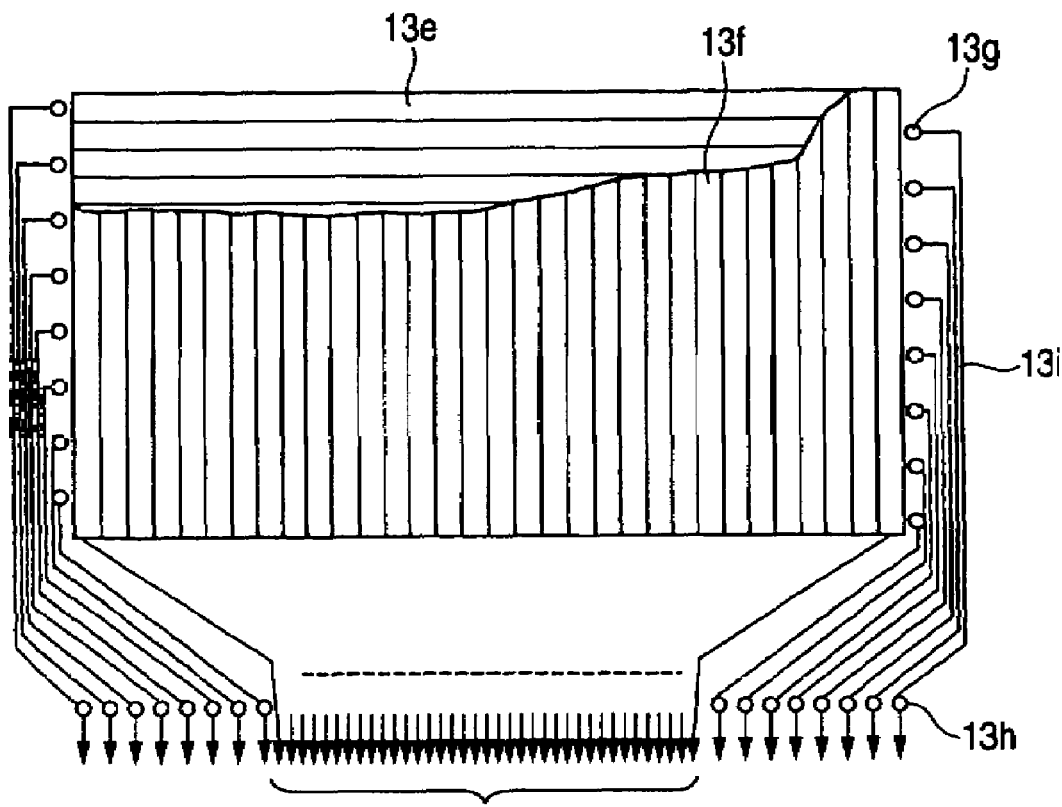
FIG. 8 is a schematic view showing the arrangement of lines as viewed from a display screen side of the display device shown in FIG. 7.

Further, lines 13e, 13f which are arranged orthogonal to each other are arranged on the two glass panels 13b, 13c, and electrodes of both lines 13e, 13f are configured to be taken out from one side of a lower-end side of the display device body 13. FIG. 8 schematically shows the arrangement of the lines 13e, 13f as viewed from a display screen side of the display device body 13, wherein to take out electrodes of both lines 13e, 13f from one side of the lower-end side of both lines 13e, 13f, lines 13e of the back-surface side glass panel 13b are pulled out to one side of the lower-end side from lines 13i between through holes 13g, 13h.

Here, the display device 10 is not limited to the liquid crystal display device or the like and may be other similar device such as an electronic paper.

Various types of planar display devices such as a liquid crystal panel cannot be used outdoors in general. A main trouble which the installation of such planar display devices outdoors has to cope with is rainfalls. Further, in installing the planar display device outdoors, it is also necessary to take safety measure such as a measure to prevent the scattering of broken pieces when the display device is broken due to an impact. Due to the high weatherability that the protective glass 20 possesses, by adhering the protective glass 20 to the front surface of the display device body 13 using the adhesive material 14, even when the display device 10 is used outdoors for a long time, it is possible to use the display device 10 in a stable manner particularly against rainfalls. Further, even when the impact is applied to the front surface of the display device 10, the scattering of the protective glass 20 is suppressed by the adhesive material 13 thus enhancing the safety.

As has been explained heretofore, according to the embodiment 1 of the present invention, in the large-sized display apparatus arranging the plurality of planar display devices, as the planar display devices, the display device 10 which comprises the display device body 13 which has the display region 11 made of liquid crystal or the like therein and has a peripheral portion thereof sealed with the sealing material which wraps the display region 11 with a predetermined sealing width 12, and the protective glass 20 which is adhered to the front surface of the display device body 13 is used. Accordingly, a front glass which has been conventionally necessary for protecting a plurality of display modules as a whole is no more necessary and hence, the structure of the frame which supports the whole apparatus can be simplified. Further, parts and the like inside the display module are exposed to outside air and hence, these parts can be efficiently cooled whereby it is possible to reduce a cooling fan, a space for ventilation and electronic equipment necessary for controlling the fan. As a result, the reduction of weight, thickness and a manufacturing cost can be realized.

Here, although the weight reduction effect of the display apparatus due to the elimination of the front glass is not constant since a weight ratio of the front glass with respect to the display apparatus changes depending on a size of the whole display apparatus, according to the present invention, it is possible to realize the weight reduction of 20% to 30% of the display apparatus even when the weight of the protective glasses are included.

Embodiment 2

Figure 9:
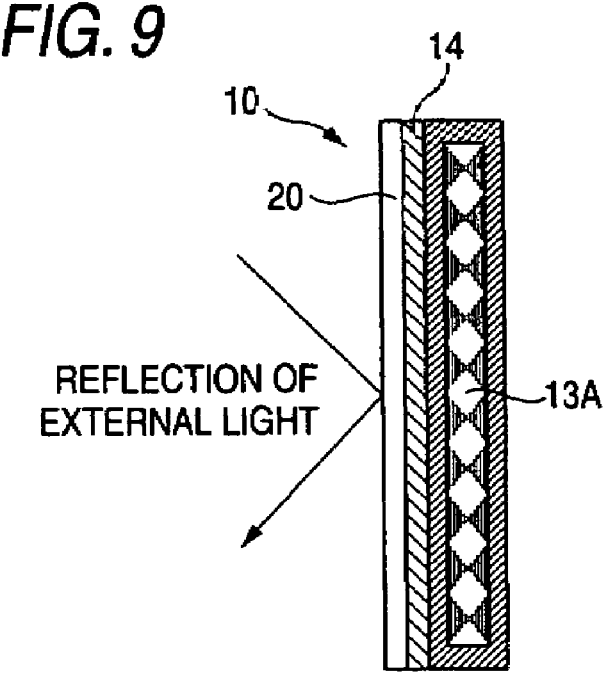
FIG. 9 is a schematic cross-sectional view of the display device shown in the embodiment 2 of the present invention.

FIG. 9 is a schematic cross-sectional view of a display device shown in the embodiment 2 of the present invention, wherein the display device uses a reflective display device body 13A as a display device body and adheres a protective glass 20 to a front surface of the reflective display device body 13A using the adhesive material 14.

The reflective display device body 13A, as shown in FIG. 9, performs a display by reflecting an external light (sunlight at noon and an illumination light at night) and hence, heat is hardly generated whereby it is possible to realize a thin display which exhibits low power consumption and requires no cooling means. Particularly, the display device which uses cholesteric liquid has excellent features such that a display is maintained even when a power source is cut and hence, it is possible to realize the display apparatus of low power consumption.

On the other hand, the cholesteric liquid crystal may change the display when a mechanical stress is applied to the cholesteric liquid crystal by pushing a display surface with a hand. Here, when the protective glass 20 is adhered to the front surface of the reflective display device body 13A using an adhesive material 14, in addition to the improvement of the weatherability and safety, elasticity and proper hardness of the glass have an advantageous effect of dispersing the mechanical stress and hence, even when a display screen is pushed with the hand, a display is stably maintained. As a result, in addition to the reduction of weight, thickness and manufacturing cost, it is possible to realize a display with low power consumption.

Embodiment 3

The glass exhibits high transmissivity of light including ultraviolet rays and hence, a display device such as a liquid crystal panel requires a countermeasure to block the ultraviolet rays. The display device has a front surface (display part) exposed to an external light. A back surface side of the display device faces to the inside of a frame and structural parts such a casing are mounted on the back surface side and hence, the influence of the ultraviolet rays is small and a countermeasure to cope with the ultraviolet rays is applied to the front surface side of the display device.

Figure 10:
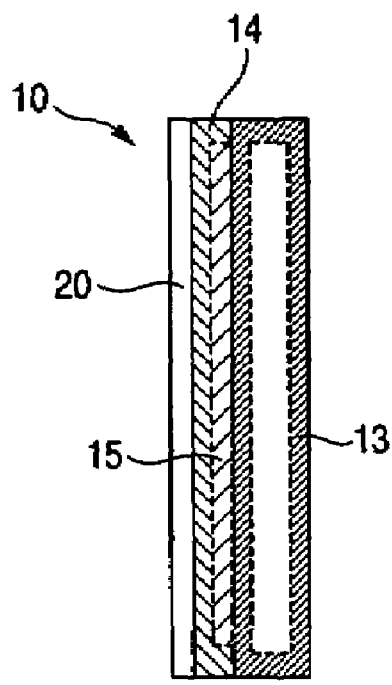
FIG. 10 is a schematic cross-sectional view of the display device shown in the embodiment 3 of the present invention.

FIG. 10 is a schematic cross-sectional view of the display device of the embodiment 3 of the present invention, wherein an adhesive material 14 and an ultraviolet ray blocking film 15 are arranged between a display device body 13 and a protective glass 20. Although the weatherability of the ultraviolet ray blocking film 15 itself is not always high in general, by adhering the protective glass 20 to a front surface of the ultraviolet ray blocking film 15 using the adhesive material 14, the ultraviolet ray blocking film 15 is protected by the protective glass 20. Accordingly, due to an ultraviolet ray blocking function attributed to the ultraviolet ray blocking film 15 and the weatherability attributed to the protective glass 20, it is possible to realize a display device 10 which can be used outside.

Embodiment 4

When the ultraviolet ray blocking film 15 is used as a means to block the ultraviolet rays described in the embodiment 3, the adhesiveness between the adhesive material 14 necessary for adhering the protective glass 20 and the ultraviolet ray blocking film 15 becomes crucial. That is, when the compatibility between them is bad, the adhesive material is peeled off at surfaces of the adhesive material and the film.

Figure 11:
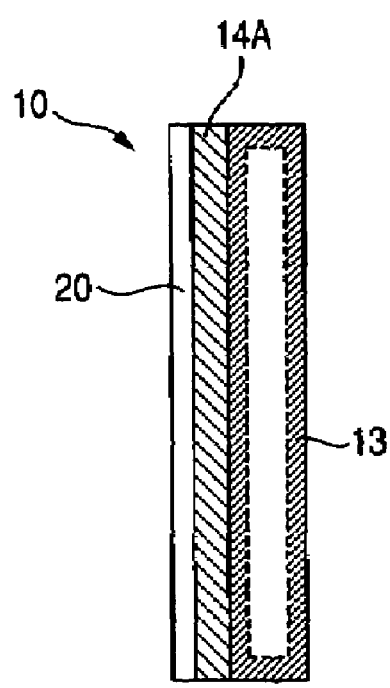
FIG. 11 is a schematic cross-sectional view of the display device shown in the embodiment 4 of the present invention.

FIG. 11 is a schematic cross-sectional view of the display device of the embodiment 4 of the present invention, wherein between a protective glass 20 and a display device body 13, an adhesive material 14A in which a UV absorbing agent is mixed is used. Since the adhesive material 14A blocks ultraviolet rays, it is possible to provide the display device 10 exhibiting high weatherability which possesses an ultraviolet ray blocking function while ensuring the weatherability attributed to the protective glass 20.

Embodiment 5

In general, a surface of a display device suppresses a reflection of an external light and hence, it is necessary to take a countermeasure to prevent the reflection of an external light. An approximately 4% of an external light is reflected on one surface of glass, while an approximately 8% of the external light is reflected on both surfaces of glass (physical properties of glass). When such glass is adhered to a surface of the display device, a reflection prevention function which the display device possesses becomes null and the reflection on the glass surface, particularly components of mirror reflection give a remarkable interference appearance to an image quality whereby a display quality of the display apparatus is lowered. Although non-reflective coating is as a countermeasure to prevent the reflection, glass to which such coating treatment is applied is expensive.

Figure 12:
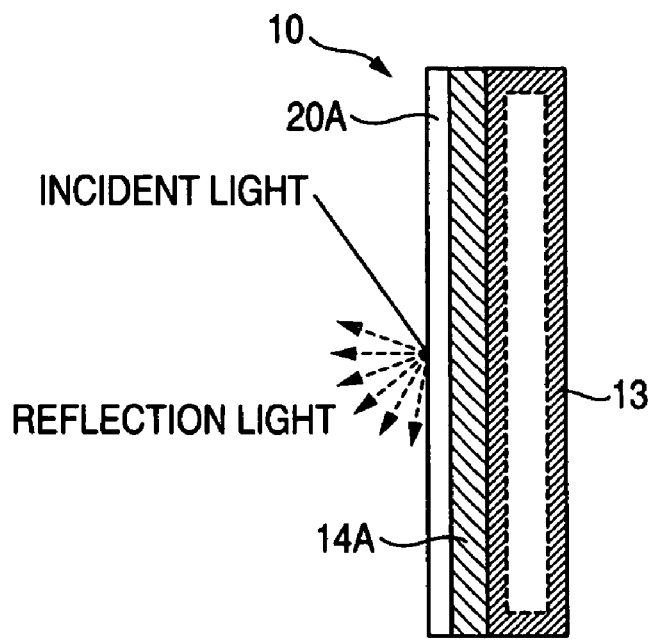
FIG. 12 is a schematic cross-sectional view of the display device shown in the embodiment 5 of the present invention.

FIG. 12 is a schematic cross-sectional view of the display device shown in the embodiment 5 of the present invention, wherein a non-glare glass 20A is used as a protective glass 20. Although the non-glare glass 20A cannot fundamentally prevent the reflection, fine irregularities are formed on a glass surface and hence, a reflection light on the glass surface is scattered. As a result, it is possible to reduce the influence of components of mirror reflection which gives a remarkable interference appearance to an image quality. Further, the non-glare glass 20A is cheap, exhibits high weatherability in the same manner as usual glass, and can be easily adhered to a front surface of the display device body 13, and can realize the display device 10 of high image quality at a low cost.

Embodiment 6

By adhering a protective glass 20 to a display surface of a display device 10, it may be possible to take a waterproof countermeasure or an ultraviolet ray countermeasure of a display screen. However, with respect to a periphery of the display device 10, ultraviolet rays enter the display device 10 from end portions and hence, there may be a possibility that the display device is locally deteriorated. In a peripheral portion of the display device 10, as shown in FIG. 4, a region (a sealing width 12) for sealing the device is ensured and hence, there arises no problem even when ultraviolet rays enter the region. On the other hand, in case of a large-sized display apparatus which arranges a plurality of display devices 10, it is necessary to narrow a width of seams at the time of arrangement and hence, the intrusion of ultraviolet rays from an end portion becomes no more ignorable.

Figure 13:
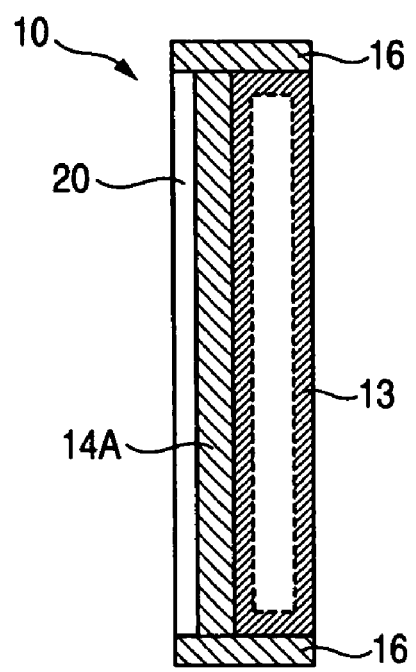
FIG. 13 is a schematic cross-sectional view of the display device shown in the embodiment 6 of the present invention.

FIG. 13 is a schematic cross-sectional view of the display device shown in the embodiment 6, wherein a UV blocking means 16 which blocks ultraviolet rays is provided to an end portion of a periphery of the display device. In this case, the UV blocking means 16 may be a method of providing an adhesive material using for adhering glass and absorbing ultraviolet rays or a method of providing a thin plastic cover.

By selecting a highly waterproof material as such an adhesive material or a plastic cover, it is possible to further enhance the reliability.

Embodiment 7

In using a reflective display device body 13A as a display device body, when light which is incident from an end portion of a periphery of a display device invades a display region after getting over a sealing width 12 of the display device shown in FIG. 4, there may be a case in which a peripheral portion of the display device becomes abnormally bright.

Figure 14:
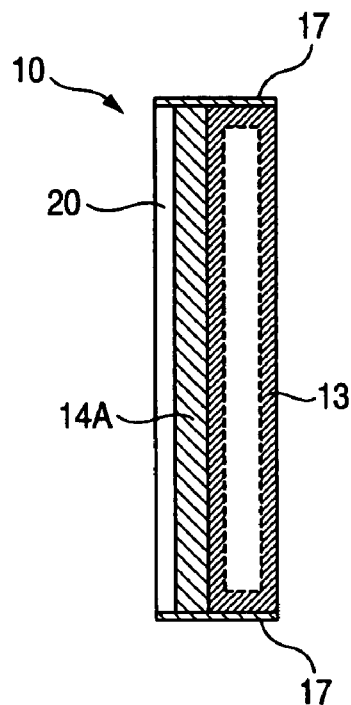
FIG. 14 is a schematic cross-sectional view of the display device shown in the embodiment 7 of the present invention.

As a countermeasure to cope with such a phenomenon, in the embodiment 7, as shown in FIG. 14, a blackening means 17 is provided to an end portion of the periphery of the display device 10 thus blocking a visible light. The blackening means 17 may be formed of a black paint or a black thin plastic cover. By blackening the end portion of the display device, a visible light incident from the end portion can be blocked and hence, the abnormal brightness of the end portion is eliminated whereby a uniform display state can be obtained. Further, the blackening of the end portion is also an effective measure to block the ultraviolet rays thus enhancing the image quality and, at the same time, the reliability of the display device 10.

Embodiment 8

As shown in FIG. 3, the main structural elements of the display module 40 comprise the display device 10 and the printed circuit board 30, wherein, in general, the electrodes of the planar display device 10 are pulled out from a sheet-like electrode such as a flexible line 42 by way of an opening portion formed in a lower portion of the display device 10.

Figure 15:
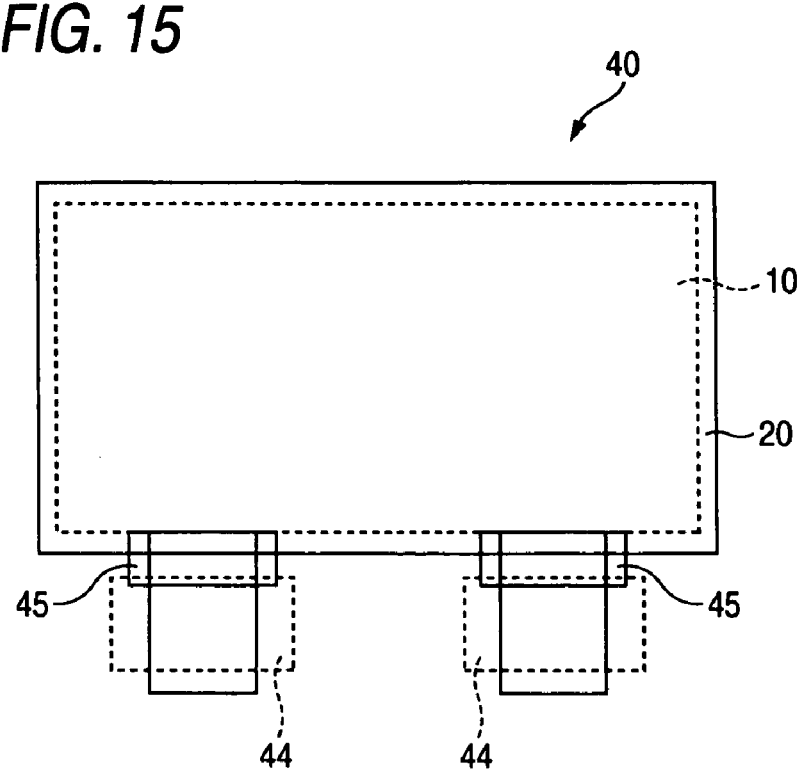
FIG. 15 is a schematic plan view of the display module shown in the embodiment 8 of the present invention.

FIG. 15 is a schematic plan view of the display module 40 shown in the embodiment 8, wherein a flexible wire 42 is covered with a waterproof film 44 and, at the same time, an end portion of the display device 10 is covered with a waterproof adhesive material 45 and hence, the reliability of connection of the end portion with the flexible wire 42 is enhanced.

Due to such a structure, the planar display device 10 which is manufactured in a usual process can be used outdoors and hence, it is possible to realize the display module 40 which can be used outdoors with the simple structure.

Here, by arranging the lower portion of the display module such that the upper portion of the display module covers the lower portion of the display module, the flexible wire 42 becomes inconspicuous and hence, the flexible wire 42 and the waterproof film 44 which covers the flexible wire 42 become inconspicuous from the front surface and the adverse influence on the image quality can be reduced.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A large-sized display apparatus comprising a frame and at least first and second separate planar display devices mounted on the frame to compose together a large-sized display, wherein:
said first planar display device includes:
a first display device body having only one first display region which is sealed around its outer periphery, and
a first protective glass member mounted directly to the first display device body in front of the first display region; and
said second planar display device spaced from said first planar display device and including:
a second display device body, separate from said first display device body, and having only one second display region which is sealed around its outer periphery, and
a second protective glass member, separate from said first protective glass member, mounted directly to the second display device body in front of the second display region, wherein an edge of the second display device is superposed in front of the first display device.

2. A large-sized display apparatus according to claim 1 wherein each protective glass member is attached to the respective display device body by adhesive.

3. A large-sized display apparatus according to claim 1, further comprising first and second control circuit boards attached to the first and second planar display devices, respectively, by respective ones of the flexible lines.

4. A large-sized display apparatus according to claim 3, wherein each flexible line is covered by a waterproof film.

5. A large-sized display apparatus according to claim 3, wherein each of the first and second planar display devices has a casing attached thereto behind the respective display region, the casings carrying respective ones of the control circuit boards.

6. A large-sized display apparatus according to claim 5, wherein each of the first and second planar display devices is attached to the frame via its respective casing.

7. A large-sized display apparatus according to claim 1, wherein each of the first and second display regions comprises cholesteric liquid crystal.

8. A large-sized display apparatus according to claim 1, wherein each planar display device further includes means for blocking ultraviolet rays installed between the respective protective glass member and the respective display device body.

9. A large-sized display apparatus according to claim 8, wherein the means for blocking ultraviolet rays is an ultraviolet ray blocking film.

10. A large-sized display apparatus according to claim 1, wherein the means for blocking ultraviolet rays comprises an adhesive material securing the respective protective glass member to the respective display device body.

11. A large-sized display apparatus according to claim 1, wherein each protective glass member comprises non-glare glass.

12. A large-sized display apparatus according to claim 1, wherein each planar display device includes means for blocking ultraviolet rays extending around an outer peripheral edge of the planar display device.

13. A large-sized display apparatus according to claim 1, wherein means for blocking visible light is installed around an outer peripheral edge of each display device body.

14. A large-sized display apparatus according to claim 1 wherein an air space is formed between said frame and said modules, the first and second modules forming an air gap therebetween communicating with said air space, a portion of said gap being formed between the first display device and said edge of the second display device.

15. A large-sized display apparatus according to claim 1 wherein said first and second modules are generally parallel and inclined relative to vertical.

* * * * *